Aug. 27, 1968     R. LANORE     3,398,617
CUTTING DEVICE FOR CIGARETTE-MAKING MACHINES
Filed Nov. 25, 1966

INVENTOR.
RAYMOND LANORE
BY Amster & Rothstein
ATTORNEYS

3,398,617
CUTTING DEVICE FOR CIGARETTE-MAKING MACHINES
Raymond Lanore, Paris, France, assignor to Usines Decoufle, Societe Anonyme, Paris, France, a company of France
Filed Nov. 25, 1966, Ser. No. 596,851
Claims priority, application France, Nov. 26, 1965, 39,910
2 Claims. (Cl. 83—331)

The present invention relates to machines for making continuous rods, such as cigarette machines in which the product, for example tobacco, is wrapped in a continuous tape, a paper tape in the case of cigarette machines, unrolled in the direction of, and at the same speed as, the tobacco rod.

The tape closed on itself is generally glued end to end and then the rod is usually cut into sections, for example cigarettes, by means of a cutting device.

The output of these machines has always steadily improved, up to several thousands of cigarettes per minute, for example.

The quality of the cutting must meet a number of requirements, notably the necessity of making the cut at right angles to the rod axis; this requirement is such that the cutter, in addition to its purely geometrical relative position condition, must accompany the rod during the cutting movement, the cutter speed along the rod axis being necessarily equal to the rod speed during the cutting operation.

Various types of cutters have already been proposed which meet this requirement. One of the most interesting devices of this type is the so-called $\alpha$ cutter in which no reciprocating motion is imparted to the blade and the plate supporting same. This cutter is easy to balance and capable of operating at very high speeds. The principle of this device is well known to those conversant with the art: the axis of the blade supporting plate is not parallel to the axis of the rod to be cut, but inclined by a generally small angle $\alpha$ in relation thereto.

The cutting takes place when the blade supporting arm is coincident with the straight line constituting the shortest distance between the cutter axis and the axis of the rod to be cut.

If R is the shortest distance and $l$ the length of the element or section to be cut (for example a cigarette), the blade will have a tangential speed component parallel to the rod equal to the rate of feed or movement of this rod, provided that the following equality is obtained:

$$2\pi R \sin \alpha = l$$

whereby $$\sin \alpha = \frac{l}{2\pi R}$$

R is a fixed dimension corresponding to the predetermined construction, and $\alpha$ a function of the length $l$ of the elements to be obtained.

Having thus met the speed requirement, the same must also apply to the geometrical position requirement so that the cut be perpendicular to the rod axis and this is obtained by inclining the blade plane with respect to the plate plane by the same angle.

Under these conditions, the various cigarette lengths are obtained by changing the angle $\alpha$, that is, by modifying the angular setting of the shaft of the blade supporting plate whereby the assembly will pivot about the imaginary axis consisting of the straight line constituting the shortest distance between the axis of the blade support and the axis of the rod to be cut, and correcting by the same amount the inclination of the blade plane with respect to its plate.

Considering a practical example in which it is assumed that the length of the elements to be cut ranges from 2⅛″ to 3⅜″ (55 to 85 mm.), the mean value is 70 mm. If R=150 mm.

for 70 mm. $\sin \alpha = \frac{70}{2\pi \times 150} = 0.074 \alpha \approx 4°15'$ The corresponding extreme vaules of $\alpha$ are:

for 55 mm., $\alpha \approx 3°21'$
for 85 mm., $\alpha \approx 5°12'$

Therefore, in this case, the angle $\alpha$ must be varied by about $\mp 1°$ about the means position. The mechanical difficulties arising from this modification are such that many cutting devices have been constructed without taking this adjustment into account.

In this case the changes in length are obtained by altering only the velocity of the cutting guides and relying on the flexibility of the cutter for following these guides.

It is the scope of the present invention to avoid this insufficiency in order to restore all the desirable properties of the cutting operation while avoiding complicated mechanical adjustments.

To this end, the cutting device according to this invention, wherein the rotary blade is rotatably driven about an axis inclined with respect to the tobacco rod by a small angle generally referred to as the $\alpha$ angle, the relative positions being such that the cutting takes place when the blade is coincident with the straight line corresponding to the shortest distance between the axis of rotation of said blade and the rod, is characterized in that the blade supporting plate is rotatably driven from a rotary shaft giving a blade speed along the rod axis which is equal to the rod speed during the cutting operation proper, in the case of cigarettes having a mean length, and that the blade supporting plate is rotatable about another shaft constituting the extension of the aforesaid shaft when the cigarettes to be cut have the aforesaid mean dimension, said other shaft being mounted in a support adapted to pivot about an axis coincident with the straight line corresponding to the shortest distance between the axis of rotation of the blade and the rod, said plate being rotatably driven from said other shaft through resilient coupling means.

In order to afford a clearer understanding of this invention and of the manner in which the same may be carried out in practice, reference will now be made to the accompanying drawing illustrating diagrammatically by way of example a typical form of embodiment of the invention.

Figure 1:
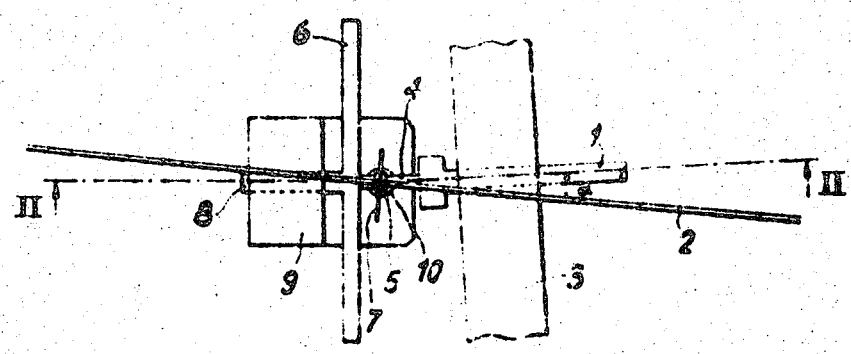
FIGURE 1 is a plan view from above of the cutting device.
Figure 2:
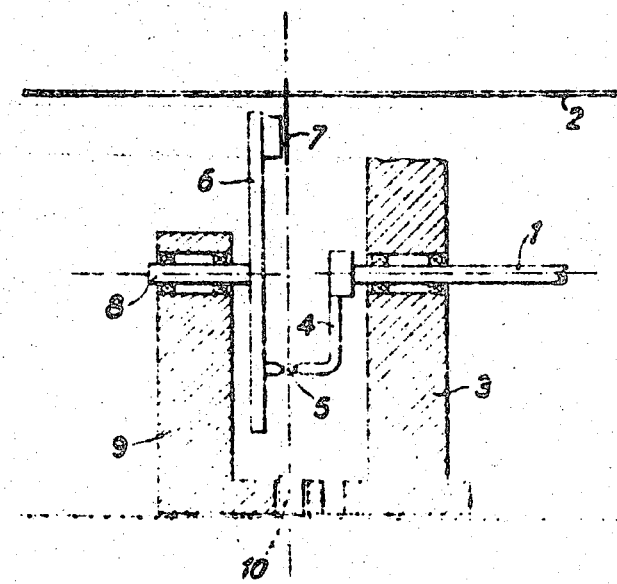
FIGURE 2 is a section taken upon the line II—II of FIGURE 1.

The driving shaft 1 forming an angle $\alpha$ with the axis of the rod 2 to be cut into sections is carried by a frame member 3 of the main frame structure of the machine (not shown) and adapted to drive through a crankshaft 4 and a coupling 5, preferably of suitable resilient type, a plate 6 carrying the blade 7 for rotation about a shaft 8 journalled in a support 9.

This support 9 is adapted to pivot about an axis 10 coincident with the straight line corresponding to the shortest distance between the axis of the power shaft 1 and the axis of the rod 2 to be cut.

By setting the support 9 in such a manner that the axis of shaft 8 is aligned with the axis of shaft 1, the resilient coupling 5 may be replaced by a rigid coupling without any inconvenience and the cutter operates like the conventional $\alpha$-cutter and has all the advantageous properties thereof. The corresponding angle α (with axes 1 and 8 in mutual axial alignment) is so selected that it corresponds to the cutting of an element (for example a cigarette) of mean length.

In the above-described example, this mean length was 70 mm., corresponding to an angle α=4°15′.

If the support 9 is rotated through 1° in one or the other direction about its pivot pin 10 having its axis coincident with the shortest distance between the axis of shaft 1 and the axis of rod 2, the elements (for example cigarettes) of extreme lengths are properly cut. All the intermediate lengths can be obtained by using the intermediate angular settings.

In the cutting device the result is the same as the one obtained for example by altering the inclination α of the cutter axis.

As the axes 1 and 8 form an angle with each other, the motion thus transmitted cannot be homokinetic if the coupling is rigid in the direction of rotation; on the other hand and in all cases it would be necessary to compensate the distance variations between the blade-supporting plate and the driving arm 4 of shaft 1. Although in this example the angle variations are moderate, of the order of ±1°, it is preferable to provide a resilient coupling which is advantageous in that it will absorb the major portion of the unavoidable speed variations while compensating variations in the distance from the driven plate 6 to the driving arm 4.

On the other hand, it is clear that the specific form of embodiment illustrated diagrammatically in the drawing and described hereinabove should not be construed as limiting the invention since many modifications may be brought thereto without departing from the spirit and scope of the invention as set forth in the appended claims.

What I claim is:

1. A cutting device for machines designed for the manufacture of a continuous rod, notably cigarette manufacturing machines, wherein the rotary cutter is rotatably driven about an axis inclined to the tobacco rod by a relatively small angle usually referred to as the alpha angle, the relative positions being such that the cutting operation proper takes place when the cutter blade is coincident with the straight line constituting the shortest distance between the axis of rotation of said cutter and the axis of said rod, said cutter device comprising a blade supporting plate, a rotary shaft adapted rotatably to drive said plate at such a speed that said blade, during the actual cutting operation, moves along said axis of said rod at a speed equal to the rod speed in the case of cigarettes of mean length, another shaft about which said blade supporting plate is adapted to revolve, said other shaft being in axial alignment with said rotary shaft when the cigarettes to be cut have said mean dimension, a support on which said other shaft is rotatably mounted, said support being adapted to pivot about an axis coincident with the straight line constituting the shortest distance from the axis of rotation of said blade and the axis of said rod, and elastic coupling means for rotatably driving said plate from said rotary shaft.

2. A cutting device as set forth in claim 1, wherein said elastic coupling means between said rotary shaft and said plate is positioned on the straight line constituting the shortest distance from the axis of rotation of said blade and the axis of said rod.

References Cited

UNITED STATES PATENTS

| | | | |
|---|---|---|---|
| 1,863,124 | 6/1932 | Platt | 83—330 |
| 1,917,187 | 7/1933 | Conti | 83—329 |
| 2,140,720 | 12/1938 | Ruau | 146—101 |
| 2,464,108 | 3/1949 | Weisner et al. | 146—101 |
| 2,981,135 | 4/1961 | Small | 83—329 X |
| 3,164,048 | 1/1965 | Wray et al. | 83—329 X |

WILLIAM S. LAWSON, *Primary Examiner.*